Patented Sept. 14, 1948

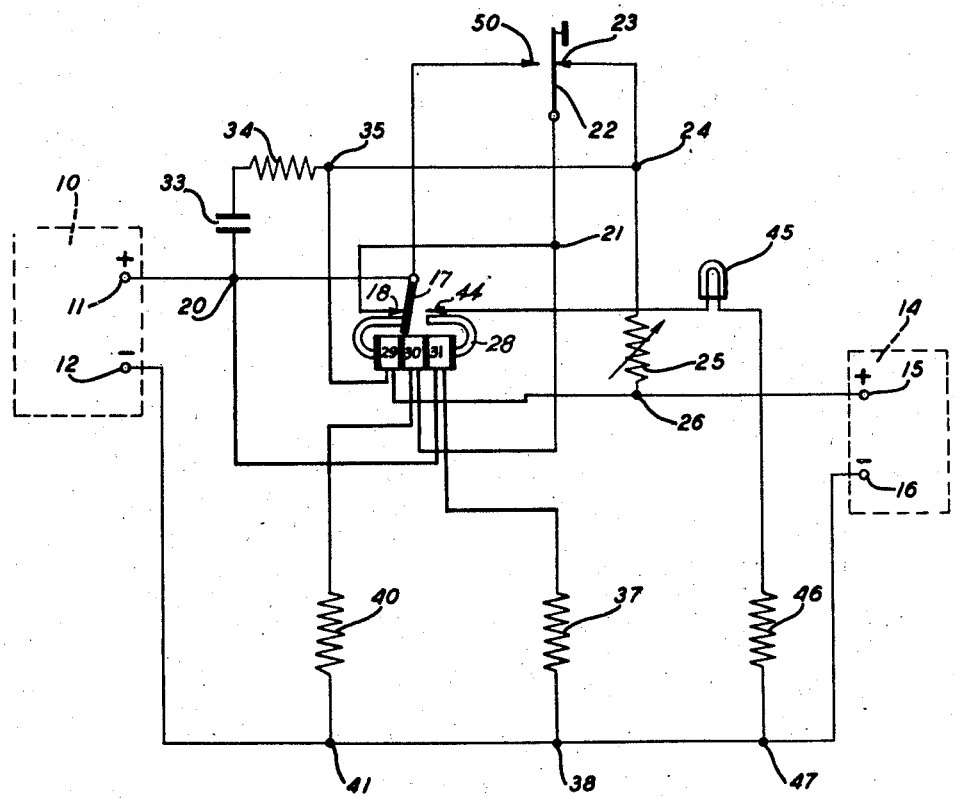
INVENTORS
A.S. HEGEMAN, JR.
H.N. SNOOK
BY E.R. Nowlan
ATTORNEY

2,449,224

UNITED STATES PATENT OFFICE 2,449,224

ELECTRICAL CIRCUIT CONTROL

Andrew S. Hegeman, Jr., Glen Ridge, and Harry N. Snook, Maywood, N. J., assignors to Western Electric Company, Incorporated, New York, N. Y., a corporation of New York Application July 15, 1944, Serial No. 545,156

1 Claim. (Cl. 175—294)

This invention relates to electrical circuit controls, and more particularly to circuit breakers.

An object of the invention is to provide an electrical circuit control which is rapidly operable, accurate and readily reset.

With this and other objects in view, the invention comprises a control including a relay armature normally held against a contact to include an electrically operable unit in a circuit to a supply of electrical energy, the armature being movable free of the contact resulting from an overload current, to thus open the circuit to the unit.

Other objects and advantages will be apparent from the following detailed description when considered in conjunction with the wiring diagram illustrating the circuit control shown on the drawing.

Referring now to the drawing, reference numeral 10 designates a power supply for supplying electrical energy of a desired value and including terminals 11 and 12. An electrical unit, indicated at 14, energizable by electrical energy to be received from the supply 10 has electrical connections 15 and 16. The electrical control, interposed between the supply 10 and the unit 14, is illustrated in its normal position, with an armature 17 engaging its contact 18. When in this, the normal position, a circuit is completed from terminal 11 through connection 20, armature 17, contact 18, connection 21, reset switch 22, its break contact 23, connection 24, variable resistance 25, connection 26, to terminal 15, through the unit 14, terminal 16, back to the supply 10 at terminal 12.

A polarized relay 28 has a primary winding 29, a secondary winding 30, and a tertiary winding 31, which function jointly and severally to control the armature 17. When the circuit control is in the normal position shown and the electrical energy is supplied to the unit 14, the primary winding 29 is connected in parallel with variable resistance 25 and in series with the unit 14. The portion of the circuit for the primary winding 29 begins with connection 24 to connection 35, through the winding 29 and connection 26, to the unit 14 at terminal 15. At the same time the tertiary winding 31 is energized through a circuit extending from terminal 11, of the supply 10, through connection 20, the winding 31, resistance 37 of a known value, connection 38, to supply 10 at terminal 12. Although the windings 29, 30 and 31 appear to be in the same directions, the secondary winding 30 opposes the primary and tertiary windings 29 and 31. The circuit for the secondary winding, when the control is in the normal position shown, extends from the supply 10 at terminal 11 through connection 20, armature 17, contact 18, connection 21, through the secondary winding 30, resistance 40 of a known value, connection 41, to the supply at terminal 12.

During normal conditions, with the unit 14 receiving the required electrical energy from the supply 10 determined by the setting of the resistance 25, the armature 17 will be held closed against the contact 18 through the magnetic force created in the polarized relay by the secondary winding 30. Thus the magnetic force created in the core of the relay 28 by the secondary winding 30 neutralizes the opposing magnetic force of the windings 29 and 31 to maintain this normal position.

Should an overload current pass to the unit 14, an increase in the electrical energy will pass through the primary winding 29, creating an increased magnetic force in the primary winding, which, when added to that of the tertiary winding 31, will exceed the magnetic force of the secondary winding 30, resulting in the movement of the armature 17 from its contact 18 and into engagement with a contact 44. As a result of this action, the main circuit is opened to the unit 14 as well as to the primary and secondary windings 29 and 30, completing a circuit through an indicating lamp 45, this circuit being traced from the supply 10 at terminal 11, through connection 20, armature 17, contact 44, lamp 45, resistance 46, connection 47, to supply 10 at terminal 12.

Through this movement of the armature 17 as previously stated, the primary and secondary windings are deenergized, the tertiary winding 31 remaining energized, however, to hold the armature closed against its contact 44. The purpose of the condenser 33 and the resistance 34 in the circuit with the primary winding 29 is to provide contact protection across the contacts 18 and 44 and the reset key 22 by a resistance capacity network.

To reset the control, the key or switch 22 is moved from its contact 23 into engagement with a contact 50 to again complete a circuit through the secondary winding 30, this circuit being traced from the supply 10 at connection 11 through connection 20, contact 50, key 22, winding 30, resistance 40, connection 41, to the supply at terminal 12. The energization of the secondary winding 30 will neutralize the magnetic force of the tertiary winding 31 and thus force the armature 17 into engagement with its contact 18, breaking its contact 44 to open the circuit to the lamp and prepare to again complete the main circuits to the unit 14 through the resistance 25 and also through the primary winding 29. After a sufficient time, determined by the deenergization of the lamp 45, has elapsed to allow for the resetting of the circuit, that is, for the movement of the armature from its contact 44 to its contact 18, the key 22 is released to thus complete the previously described main circuit, returning the control to normal.

Although specific improvements of the invention have been shown and described, it will be understood that they are but illustrative and that various modifications may be made therein without departing from the scope and spirit of this invention as defined by the appended claim.

What is claimed is:

An electrical circuit control, interposed between an electrical current supply and an electrically energizable unit comprising a polarized relay having a primary winding, a tertiary winding and an opposing secondary winding, the latter normally creating a magnetic force exceeding the combined normal magnetic force of the primary and tertiary windings, an armature for the relay actuable into open and closed positions to open and to close circuits from the supply and extending respectively through the unit, the primary winding and the secondary winding, the tertiary winding being included in a circuit extending directly from the supply, and a switch to initially complete a circuit from the supply through the secondary winding to cause movement of the armature into its closed position, the primary winding being affected by an overload current to the unit to neutralize the magnetic effect of secondary winding and with the magnetic force of the tertiary windings to cause movement of the armature into its open position and cause deenergization of the primary and secondary windings and the unit, the magnetic force of the tertiary winding holding the armature in its open position.

ANDREW S. HEGEMAN, Jr.
HARRY N. SNOOK.

REFERENCES CITED

The following references are of record in the file of this patent:

UNITED STATES PATENTS

| Number | Name | Date |
| --- | --- | --- |
| 518,471 | Smith | Apr. 17, 1894 |
| 656,324 | Holmes | Aug. 21, 1900 |
| 1,204,485 | Randall | Nov. 14, 1916 |
| 1,298,464 | Creveling | Mar. 25, 1919 |
| 1,547,693 | Schon et al. | July 28, 1925 |
| 1,594,275 | Spain | July 27, 1926 |
| 1,671,023 | Fitzsimmons | May 22, 1928 |
| 2,108,775 | Macgeorge | Feb. 15, 1938 |
| 2,153,291 | Bakker | Apr. 4, 1939 |
| 2,170,964 | Perry | Aug. 22, 1939 |
| 2,359,175 | Walley | Sept. 26, 1944 |